United States Patent
Killow et al.

(10) Patent No.: US 9,444,674 B2
(45) Date of Patent: Sep. 13, 2016

(54) HEURISTIC ANALYSIS OF RESPONSES TO USER REQUESTS

(71) Applicant: MICRCOSOFT CORPORATION, Redmond, WA (US)

(72) Inventors: Mark Killow, Vancouver (CA); Marcelo De Barros, Redmond, WA (US); Manish Mittal, Redmond, WA (US); Theodor Ilie, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 438 days.

(21) Appl. No.: 13/633,786

(22) Filed: Oct. 2, 2012

(65) Prior Publication Data

US 2014/0095697 A1 Apr. 3, 2014

(51) Int. Cl.
*H04L 12/24* (2006.01)
*G06F 17/30* (2006.01)

(52) U.S. Cl.
CPC ........ *H04L 41/0631* (2013.01); *G06F 17/30* (2013.01); *H04L 41/0604* (2013.01); *H04L 41/0636* (2013.01); *G06F 17/30899* (2013.01)

(58) Field of Classification Search
CPC ....... H04L 43/00; H04L 43/02; H04L 43/04; H04L 69/00; H04L 41/0604; H04L 41/0631; H04L 41/0636; G06F 15/173; G06F 17/30; G06F 17/30899
USPC ....................................................... 709/224
See application file for complete search history.

(56) References Cited

U.S. PATENT DOCUMENTS

| | | | |
|---|---|---|---|
| 7,630,968 B2 * | 12/2009 | McCammon | ....... G06F 17/2785 |
| 7,999,809 B2 | 8/2011 | Beers et al. | |
| 8,046,734 B2 | 10/2011 | Brown et al. | |
| 8,060,463 B1 * | 11/2011 | Spiegel | .................. G06Q 30/02 707/609 |
| 8,135,610 B1 * | 3/2012 | Bryce | .............. G06Q 10/06395 705/7.41 |
| 8,146,068 B2 | 3/2012 | Tal | |
| 2006/0176824 A1 * | 8/2006 | Laver | ...................... H04L 12/24 370/241 |
| 2008/0282186 A1 * | 11/2008 | Basavaraju | ........... G06F 3/0482 715/781 |
| 2009/0216875 A1 * | 8/2009 | Shi | ....................... H04L 63/0236 709/224 |
| 2009/0234720 A1 * | 9/2009 | George | ................. G06Q 10/06 705/7.42 |
| 2010/0138388 A1 | 6/2010 | Wakeling et al. | |
| 2010/0286952 A1 * | 11/2010 | Mukherjee | .............. G06F 11/34 702/179 |
| 2010/0318609 A1 | 12/2010 | Lahiri et al. | |
| 2013/0246606 A1 * | 9/2013 | Branch | ............... H04L 41/0853 709/224 |

OTHER PUBLICATIONS

Venugopal, et al., "A Set Coverage-based Mapping Heuristic for Scheduling Distributed Data-Intensive Applications on Global Grids", In Proceedings of 7th IEEE/ACM International Conference on Grid Computing, Sep. 28, 2006, 9 pages.

* cited by examiner

*Primary Examiner* — Michael C Lai
(74) *Attorney, Agent, or Firm* — Dave Ream; Tom Wong; Micky Minhaus (57) ABSTRACT

Systems and methods are provided for monitoring the performance of a network with respect to providing results for user requests. A user request can correspond to a search query, an entry of a uniform resource locator (URL) or other address for a document on a network, or another type of request. A plurality of user requests are aggregated, such as based on logs of search query or browsing activity. A representative group of user requests is selected and then submitted in order to evaluate the results provided. Based on a heuristic analysis of the results, an alert can be provided to indicate potential performance problems in the network environment.

20 Claims, 5 Drawing Sheets

FIG. 5 ures of the invention.

HEURISTIC ANALYSIS OF RESPONSES TO USER REQUESTS

BACKGROUND

Wide area networks provide an opportunity for a large number of entities to make content accessible to others. One benefit of such networks is an ever increasing and changing amount of content that is available. In order to help users find various types of content, search engines crawl wide area networks to identify new and/or changed content. This allows users to locate new content as it becomes available.

However, due to the large number of entities that provide content, quality control of new content is uneven. Some content may appear to be available, but is actually not properly formatted for viewing. Other content may be of a character that is not appropriate for viewing by all types of users. Still other problems can be related to the operation of the search engine itself. If the initial crawling and processing work of the search engine is not performed properly, the results provided to users in response to a search will be impacted.

SUMMARY

In various aspects, systems and methods are provided for monitoring the performance of a network with respect to providing results for user requests. A user request can correspond to a search query, an entry of a uniform resource locator (URL) or other address for a document on a network, or another type of request. A plurality of user requests are aggregated, such as based on logs of search query or browsing activity. A representative group of user is selected and then submitted in order to evaluate the results provided. Based on a heuristic analysis of the results, an alert can be provided to indicate potential performance problems in the network environment.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein.

DETAILED DESCRIPTION

Overview

In various aspects, systems and methods are provided for monitoring the performance of wide area networks with respect to providing results for user requests. A user request can correspond to a search query, an entry of a uniform resource locator (URL) or other address for a document on a network, or another type of request. A plurality of user requests are aggregated, such as based on logs of search query or browsing activity. A representative group of user requests is identified or selected. The representative group of user requests is then submitted in order to evaluate the results provided. One or more features of the provided results are analyzed using heuristics to generate a numerical analysis, such as a percentage of user requests that result in satisfying a condition specified in the heuristic. These heuristic values can be used directly to identify potential problems, or at least a portion of the heuristic values can be aggregated to provide an overall score. Optionally the aggregation of the heuristic values to provide an overall score can correspond to combining the heuristic values based on weights associated with the various heuristics.

Due to the increasing usage of wide area networks, millions (or more) of requests are made each day by users for various types of content. While logfiles can capture the nature of the requests made by users, it is more difficult to capture the nature of the results provided to the users. In particular, it can be difficult to determine whether the results provided in response to user requests are useful, appropriate, or even if the results are the correct type of response.

Since the nature of the requests made by users is known, one way to determine the nature of the responses received by users is to replicate submission of user requests for a representative sample of such requests. For example, a logfile of search queries can be analyzed to determine the number and type of search queries submitted by users. The distribution of search queries submitted by users can then be sampled in any desired manner to build a representative query list. These representative queries can then be submitted to a search engine generate responsive results. The responsive results can then be analyzed by identifying various features of the results. By generating results that would be seen by a user and then analyzing the results, information can be gathered regarding whether the correct types of results are being provided. The results can also be analyzed to determine whether the provided results are valuable and/or appropriate for display.

Based on the analysis of the generated results, a variety of values can be calculated and used to provide alerts to users, system administrators, or another interested party. One option is to aggregate values from a plurality of heuristics to monitor the operation of a search engine or other system that provides results. Another option is to monitor the responses provided for certain types of queries. For example, some queries are known, considered, or otherwise identified as corresponding to navigational queries. Navigational queries refer to queries where a particular network address is associated with the query, so there is an expected address that corresponds to the top search result. If a navigational query is submitted but generates a different address for the first result, this may indicate a problem with the search engine.

Selecting Representative User Requests

In various aspects, identifying and/or selecting representative user requests can include two types of activity. One task is to determine the number and/or contents of the requests being submitted by users. A second task is to sample the requests in a manner that is representative for the type of information that is of interest. The result of these tasks is selection of a plurality of user requests.

A first task can be to determine the content of requests being submitted by users, including some type of indication of the number of distinct requests based on content. The requests from the users can correspond to search queries, entries of uniform resource locators (URLs) or other network addresses into an address bar, clicks on links corresponding to network addresses, or another type of user request where a user provides a request and a response corresponding to one or more results is provided, such as one or more results corresponding to documents available via a wide area network. Preferably, a user request corresponds to a request that can be processed by an associated request environment to generate a responsive result. Thus, a search engine corresponds to an associated request environment for a search query. For a network address or a uniform resource locator, the address bar of a browser is an example of a suitable associated request environment. Typically, only a single type of user request will be tracked in a given data set. Thus, the types of user requests may be search queries, or URLs, or another request type.

One method for determining the content and number of distinct user requests is to extract user request information from one or more logfiles of user activity. For example, search queries submitted to a search engine can be stored in a logfile. The query terms in a search query represent at least a portion of the content of the user request. The number of occurrences of each request that have the same content, or optionally content that is interpreted as the same, can then be counted based on the stored queries. Optionally, additional information can be stored as part of the content of the user request. For example, for a user request corresponding to a search query, additional information that can be included as part of the content of the user request optionally includes one or more context values related to a user context, a search history context, or another type of context that can be used by a search engine to modify a set of responsive results. As another example, a network address entered into a browser address bar would represent at least a portion of the content for a different type of request. Another option for determining the content and number of user requests is to extract information about user requests from a database of error reports or another type of information related to a user problem or complaint.

The above examples of sources for user requests correspond to extracting information regarding previously submitted user requests. These examples are illustrative only. As an alternative, user requests can be captured as they are received and added to a database for tracking the content and number of distinct requests.

After determining the content of distinct user requests, a plurality of user requests can be selected to generate a representative list of user requests for use in determining heuristic values. If the listing of distinct user requests is not too large, all of the user requests can be selected for use as a representative sample. More typically, the user requests will be sampled of that a subset of all of the user requests is selected.

The user requests can be sampled in any convenient manner. One option is to select from a flat list of distinct user requests, with each request having equal weight for sampling regardless of how many times the request was submitted by any user. Another option is to sample the user requests based on the frequency of the user requests in the source. For example, if each occurrence of a user request is extracted, so that the listing of user requests includes duplicates, the listing of user requests will automatically have a weighting based on the popularity of the user requests. Alternatively, a distribution can be imposed on a listing of user requests, so that the probability of selecting a given user request from the listing is not the same for all requests in the listing. Such a distribution can be based on a frequency in the extracted data, a frequency based on historical data, a frequency weighted based on other parameters and/or historical information relevant to a desired scenario, or any other convenient type of distribution. Still other convenient methods of sampling can also be used.

The above description has focused on distinct user requests, with a request defined based on a query submitted by a user. Additionally or alternately, other factors can be considered in determining which user requests to use for sampling. For example, it may be of interest to analyze search queries from a specified geographic region. In such a situation, one option would be to only sample requests from a specified region, such as a particular country in Europe or a particular region of the US. Such requests can be selectively sampled, for example, by selecting requests that have a context value that matches a value from a predetermined list of context values. Another option would be to consider an associated geographic location as part of determining what constitutes a distinct user request. For example, if geographic regions are of interest, a search query of "local concert tickets" associated with Boston, Mass. could be considered a distinct user request versus a query containing the same terms but associated with a different location and/or region, such as Evanston, Ill. or San Bernadino, Calif. More generally, any convenient type of user context value can be considered in determining what constitutes a distinct request, such as demographic context, geographic context, or context from prior search and/or on-line activity.

In addition to user requests based on captured user activity, some user requests may be of interest for other reasons. For example, some user requests may be known to have a high frequency over a long period of time. Other user requests may be valuable due to being representative of a desired feature in a user request. For any convenient reason, it may be desirable to have a supplemental listing of user requests that is not based on a current set of logfiles being used to select user requests. These supplemental user requests can be added to the group of selected user requests. Some or all of the supplemental user requests can be added, depending on the embodiment. Optionally, the listing of supplemental user requests can also be sampled in a manner similar to the logfiles of user requests.

The above description has focused on selecting distinct user requests in a search context. Those of skill in the art will recognize that logfiles of other types of user requests, such as entries of URL's into browser address bars, can similarly be processed to identify and sample the user requests in order to select a plurality of user requests. Similarly, supplemental lists can also be used to add additional user requests to the selected plurality of user requests for such other types of user requests.

Generating Results and Applying Heuristics

After selecting a representative group or other plurality of user requests, the selected plurality of user requests are submitted in order to generate results. The goal of generating results is to produce results representative of the results various users have received and/or would receive by submitting the same requests. In situations where context can affect the nature of results returned in response to a request, the context can be set in any convenient manner. In some embodiments, the same context can be used for all requests submitted during generation of the results. In other embodiments, one or more context values associated with a request can be extracted from the logfiles and included as part of the user request. Still another option is to generate some type of average of the context values associated with a given request and apply at least a portion of that average context when submitting the user requests. The average context can be based on an average of the context of all requests in the original request data set, or based on an average of the context of the selected requests. Still another option is to assign at least a portion of the context values based on a desired problem for investigation, such as setting context to generate results for a desired geographic region or setting context to generate results for users with specific types of search history features.

As results are generated, the results can be probed, tested, or otherwise analyzed to determine various features or properties of the results using one or more heuristics. In this discussion, a heuristic is used to refer to any type of automated analysis that can be performed on a result in order to generate a logical (i.e. Boolean) or numeric result that characterizes a feature or property of a result. These logical or numeric values based on features or properties of a result represent raw data for evaluating performance in response to a user request. Some features or properties can be relatively straightforward to characterize. For example, for a user request corresponding to a search query, one potential heuristic is to determine whether any links on a page of provided search results actually correspond to broken links that do not result in a page being displayed. Such a heuristic could be used to generate a logical value, indicating simply whether any broken links exist. Alternatively, such a heuristic could be used to generate a numeric value, such as a percentage of broken links relative to the total number of links displayed or alternatively a number of broken links. Other properties may require comparison with stored data. As another example of a heuristic, the top result displayed in response to the same search query on consecutive days can be compared as one indicator for how a results page for a given query changes over time. More generally, any other feature or property that can be analyzed based on result generated in response to user requests can be characterized for each request in a selected set of requests.

It is noted that the features or results that are analyzed for the results pages do not have to be appropriate for the results generated by every request in a set of selected requests. For example, "navigational" queries refer to queries that clearly refer to a particular web site or entity. For example, queries related to popular social media sites or popular mail programs may potentially be specific enough to be navigational queries. For such navigational queries, a feature related to changes in the first link listed on a results page is a relevant feature. However, a navigational query has an expected first result that should not vary over time, so the expected percentage of navigational queries with a different first displayed result over time is lower than the expected percentage of all queries that have a different first result over time. As a result, in addition to determining the number of queries overall that have a different first result over time, the number of navigational queries with a different first result over time can optionally be tracked. Another type of heuristic specific to a navigational query could be related to whether one or more features of a known navigational result are displayed properly. Due to the relatively small number of navigational queries, it would be feasible to determine one or more of the expected page features for any desired navigational result pages. One or more heuristics could be used to verify the proper operation of such expected page features.

Applying a heuristic to a result leads to the generation of a heuristic value for that heuristic and the particular result. As features or properties of the various generated results are analyzed, the heuristic values based on the result features can be aggregated over all of the tested results. This aggregation can correspond to generating an average over the results, a summation of values over the results, or some other combination of the heuristic values so that a single value for the heuristic is generated for the (at least a portion of the) selected user requests. For example, the number of links on the first results page that correspond to broken links can be determined for each query in a selected set of queries (i.e., user requests). The total number of broken links can then be aggregated to generate a value over the entire set of results. This number of broken links can then be compared to an expected number to determine if the broken links are likely due to typical outages of web servers, or whether a more serious problem may be occurring. Alternatively, as opposed to reporting a number of broken links, a percentage of broken links based on the total number of considered links could be reported. Another example is to determine whether the first listed result has changed since the last analysis for each (appropriate) query in the selected set of results. This information can be aggregated over all queries to determine a percentage of queries where the first result has changed. Again, some amount of change would be expected on a daily or weekly basis. If the percentage of queries with changed first results is too high or too low, this could indicate a problem with the search engine's mechanism for crawling web sites.

Those of skill in the art will recognize that the types of heuristics described above can be applied to investigate a wide range of features or properties of a wide range of results. The analyzed features may correspond to issues that require immediate attention, or the analysis values may be directed to more general indicators of system health. The following examples are intended as illustrations of how heuristics can be applied to investigate the health of a network based on responses to user requests.

Example 1

Delivery of Working Pages in Response to URL User Requests

In this example, network addresses (such as URLs) that a user attempts to access are used as user requests. The network addresses can be web addresses (such as URLs) that a user enters directly into an address bar, addresses that are accessed when a user selects a link on a web page, or addresses that are submitted in any other convenient manner by a user in order to view content (i.e. results) at the specified address. The addresses can be accumulated based on activity logs generated by an internet service provider, activity logs captured by a user's toolbar, activity logs captured by a firewall for a corporate network, or the addresses can be accumulated from any other convenient source for determining addresses requested by a user. It is noted that a "user" in this context could also refer to an automated script that visits network addresses, or another type of "user" that is not directly under the control of a person.

After network addresses are captured in one or more logfiles, a representative group of network addresses are selected for testing. In this example, the addresses are selected by sampling from the raw user logs using a flat distribution. This will result in selection of addresses based on the frequency of occurrence of the address in the aggregated logfiles. The aggregated listing of addresses can correspond to any convenient time period, such as 24 hours or 1 week.

The selected addresses are then used as requests in order to access the pages corresponding to the addresses. In this example, the page displayed in a web browser when the address is entered corresponds to the result returned in response to a user request. For this analysis, the context used when attempting to access the URL is not important, so a default context (or alternatively no context) is used when attempting to access the selected addresses. For addresses that are repeated in the distribution, the address only needs to be visited once. If desired, any resulting values for a repeated address can be weighted based on the number of repeat instances of the address in the selected set of addresses. As a less preferred alternative, a brute force method of processing the selected addresses could also be used, so that repeat addresses are visited again and processed in order to accumulate desired statistics.

When a selected address is visited, the expected result is that a page for display in a browser will be returned as a result. One initial heuristic can simply be a logical or Boolean value regarding whether a valid page is returned and/or whether some other type of error occurs so that a result page is not available for display. In this situation, an "error" is broadly defined to include any type of situation that results in a page not being available for display. For example, if the URL corresponds to an address that does not currently belong to an entity, some browsers are configured to divert and display an advertising page offering to allow the user to purchase the available address. In this example, even though some type of page is available for display in the browser, this does not correspond to a result generated in response to a URL, and would therefore be counted as a failure to display a page. As another example, the URL or address may correspond to a known site, but the site is unresponsive. This also corresponds to a failure to display a page.

Another potential heuristic is whether the selected address results in a redirection to another site. A redirection request can correspond to proper working behavior, but sometimes a redirection indicates a malicious site. One or more features of the redirected address and/or result page can be compared with the original selected address in additional heuristics. These additional features can be used, for example, to provide additional indications of whether the redirection appears to be by a common owner of both the original address and the redirection address, a non-malicious different entity, or a malicious entity.

Various heuristics can also be used to investigate the behavior of the results page. For example, many types of pages include some form of advertising. However, if the latency for preparing the advertising for display is too long, one or more ads on a page may be omitted in order to deliver the results page to the user in a timely manner. The page locations dedicated for advertising can be determined and a success rate for delivery of ads can be determined for each page. This could be characterized, for example, by simply tracking a Boolean success or failure value for each intended advertising slot on a page. Alternatively, total ad requests versus ad deliveries can be tracked as a percentage, or the raw ad request and ad delivery values can be summed per result page.

More generally, any other convenient feature of a results page in response to a URL or other address can be tracked using heuristics to compare the intended content versus the delivered content. Other page features that can be tracked in this manner include multimedia content such as images or videos; whether intended links on the page correspond to valid URLs or other addresses; whether a "next page" feature for a results page corresponding to multi-page content is working; or other features where an intended type of content on the page is apparent, so that the intent to deliver content can be tracked versus the success or failure of actual delivery.

Still other features related to proper working of a page delivered in response to an address can also be used to form heuristics. Any suitable feature that may be of interest can be investigated. For example, another heuristic could be whether a results page includes any raw HTML or other raw code used for specifying web page contents.

Based on the heuristics used to investigate the behavior of pages returned for display in a browser in response to an address, statistics can be accumulated over the range of selected addresses. For each heuristic, the accumulated statistics can be used to generate values. The generated values can correspond to a percentage, such as by determining a percentage of visited sites that had a Boolean value of yes, true, or another positive outcome for a given heuristic; or a percentage based on accumulated raw values over the visited sites; or an accumulated total for a heuristic where the magnitude of a value is informative. More generally, any other way for generating a number or other value representing accumulated data for a feature across the visited sites can be used as the output from a heuristic.

Depending on the nature of the heuristic, the accumulated value may indicate various information about the operation of sites corresponding to visited addresses. For example, for the delivery of advertising on visited sites, some amount of failure for delivered ads would be expected. Over time, an average rate of ad failure could be determined, along with a deviation. A rate of ad failure either above or below the expected rate of ad failure by a sufficient amount based on the variance in the data could be an indicator of a system problem. A high rate of ad failure could indicate a problem with a general service for providing ads. A low rate of ad failure could indicate that sites are being served unusually slowly, so that more sites than expected are waiting for ads to arrive before serving a result. Or possibly a low ad failure rate could indicate that a main portion of multiple sites is being delivered slowly, so that the advertising server has additional time to provide a result before the ad server is timed out.

Similarly, heuristics related to general site availability can be used to indicate whether network traffic is being served appropriately. For example, if an unusually high number of address redirections are detected, it could indicate the presence of a virus or other malicious software that has infected one or more network locations. A high number of web sites showing raw HTML code as part of a web page could indicate that a new update has been provided for some type of browser, but the update is not working properly. More generally, any other convenient heuristics can be used that are indicative of one or more types of problems that can occur when a page is provided in response to entry of a network address into a browser.

Example 2

Delivery of Appropriate Content in Response to User Search Requests

In this example, heuristics are used to identify situations where content is returned in response to a user request that may be inappropriate. One common example of this type of situation is the return of links to sites containing adult material in response to a search query. In some embodiments, it is preferred to offer results to general search queries that are appropriate for a general audience. Thus, even though an adult-oriented site is considered responsive to a query, it is preferable to avoid displaying the result as responsive unless the user entering the search query has provided an indication that such content should be displayed, such as by altering a privacy or content setting on a browser. When a user has not provided an indication that adult-oriented material should be displayed, the display of a link or other content related to an adult-oriented network site can be considered as an error. In an embodiment, the methods described herein can be used to identify the occurrence of such errors. This can allow a response team to be notified to determine the source of the error and/or to take corrective action prevent future inappropriate display of such content.

In this example, search queries are used as the user requests. The search queries can be queries that a user enters directly into a search box, a query selected from a listing of queries proposed to a user by a search engine, an implicit query that is used by a search engine in place of or in addition to a query submitted by a user, or any other type of query that causes a listing of search results to be provided to a user. The queries can be accumulated based on search logs generated by search engine and/or search engine provider, activity logs captured by a user's toolbar, activity logs captured by a firewall for a corporate network, or the queries can be accumulated from any other convenient source for capturing search queries that are submitted to a search engine. It is noted that a "user" in this context could also refer to an automated script that submits search queries, or another type of "user" that is not directly under the control of a person.

After search queries are captured in one or more logfiles, a representative group of queries are selected for testing. In this example, the queries are selected by sampling from the raw user logs using a flat distribution. This will result in selection of queries based on the frequency of occurrence of a query in the aggregated logfiles. The aggregated logfiles of queries can correspond to any convenient time period, such as 24 hours or 1 week.

In this example, the queries selected from the logfiles are also supplemented with one or more queries from a predetermined group or list. These supplemental queries are included as part of the selected queries. The supplemental queries can be generated or provided in any convenient manner. For example, the supplemental queries can correspond to queries that have a high frequency over a specified time period, queries that have been identified in the past as being likely to include inappropriate results, or queries identified by any other convenient method. If a supplemental query is identical to another selected query, the supplemental query can be counted as a repeat instance, or the supplemental query can be ignored since the supplemental query is an artificial "repeat".

The selected queries are then used as requests in order to access the pages of responsive results generated by a search engine. In this example, the page displayed in a web browser in response to a query corresponds to the result returned in response to a user request. In many instances, this will correspond to a listing of results responsive to the query, such as a listing of links to various addresses. The listing of results may also include snippets or other descriptions of the content that can be found at the links. The listing of results may also includes other types of content, such as video, image, or other multimedia content; advertisements; sponsored links, or other types of advertising; additional information about a given result, such as deeplinks within a domain for a result; suggested queries, answers, or other direct content on the results page; or any other convenient type of content. Alternatively, some queries may result in direct display of a web page from a network address. For example, some queries are considered navigational queries that identify a specific network address. In some embodiments, a search engine that receives a navigational query could return the page for the corresponding network site as opposed to returning a link to such a site.

In some embodiments, the context used when submitting a search query to a search engine is not important, so a default context (or alternatively no context) is used when submitting the search query. For queries that are repeated in the distribution, the query only needs to be submitted once. If desired, any resulting values for a repeated query can be weighted based on the number of repeat instances of the query in the selected set of queries. As a less preferred alternative, a brute force method of processing the selected queries could also be used, so that repeat queries are visited again and processed in order to accumulate desired statistics.

For the embodiment described in this example, the context used when submitting a search query to the search engine is included. Thus, in this example, the fact that two queries have the same terms in the same order is not sufficient to classify the queries as identical. Instead, one or more context values are also included as part of the query. Thus, for two selected queries to be considered identical, the two queries have to share all query terms as well as sharing the same one or more context values.

Another consideration in selecting context for search queries is whether more than one search engine needs to be accounted for. In some embodiments (including this example), all query logfile data will correspond to queries submitted to a single search engine. However, query logfiles from different search engines could be used as the source for selection of search queries. In this discussion, different search engines could refer to search engines operated by different entities; a single search engine with two or more different algorithms for generating and/or ranking responsive results; or multiple search engines operated by the same entity. The use of more than one type of search engine for generating a query logfile can be handled in any convenient manner. One option is to select queries and submit all of the selected queries to a single search engine of interest. Another option is to submit all selected queries to each search engine of interest, so that multiple search engines are investigated. Still another option is to use the search engine as part of the context for a query, so that a query is submitted to the search engine the query was associated with in a query logfile.

The selected queries are then used by submitting the search queries to a search engine. Submitting the search queries will generate a page of responsive result(s) for each query. Heuristics can then be used to investigate the pages of responsive results to determine whether any inappropriate content is present on the page. One type of analysis is to determine whether any text on the page is inappropriate, such as inappropriate words or groupings of words. A Boolean type variable can be used to indicate the presence or absence of any inappropriate words or phrases. Optionally, some words or phrases may have different levels of sensitivity. To account for this, the inappropriate words or groupings of words can be organized into categories, with a separate Boolean variable for each category of word or phrase that appears on a results page.

Another type of analysis is to determine whether any inappropriate multimedia content is present on a page, such as images or video. Still another type of analysis could be to consider additional types of inappropriate content. For example, based on a parental control-type setting for a browser, a user may indicate that violent content should also be considered as inappropriate.

In this example, all of the various heuristics can be used to generate a single number for whether inappropriate content is displayed as part of search results. Optionally, if multiple types of content are considered inappropriate, such as adult content and violent content, a number can be generated for each type of inappropriate content. The single number (optionally for each type of content) can be generated by aggregating the values from all heuristics.

One option for aggregating the heuristic values is to use a simple summation or average of values. Alternatively, some type of weighted average can be used in order to reflect the relative importance of certain heuristics. For example, the presence of inappropriate video content may be considered a more urgent problem than the presence of inappropriate text content. As a result, when combining heuristics related to video and text content into a single value, the heuristic for inappropriate video content can be given a larger weighting factor so that even a single instance of inappropriate video content generates a warning, while it may require several instances of text content to generate a warning. Although weighting factors are often considered as multipliers, in some embodiments the weighting factor can take another form, such as an exponential weighting factor. Thus, one example of a weighting factor could be to combine the values for text and video content by adding the value for text content to the square of the value for video content.

After generating a value related to the presence of inappropriate content, a user or response team can be notified of the value. The notification can be in the form of a standard report, a report issued because the generated value is greater than a threshold, an alert delivered to the screen of a user and/or as a message as a user to notify the user to review the report, another type of alert regarding the status of whether a report is available for review, or any other convenient method of alerting a user to the presence of the information.

Example 3

Overall System Health for Search Query Service

This example provides another embodiment where system health of a search engine is investigated using heuristics. In this example, a variety of values regarding a results page are investigated. In addition to providing the individual values, a report can also provide a single number as a measure of overall system health.

In this example, all of the selected queries correspond to queries from a listing of queries. The queries can optionally include one or more context variables. The heuristics investigated for each query are tracked on a daily basis. The change in heuristic values on the daily basis can then be used as an indication of system health.

In this example, the following values are monitored for selected queries on a daily basis. Of course, other values could also be monitored. The monitored values include: 1) Change in the result title for any title in the ten primary result links on the first results page; 2) Change in the URL for any URL in the ten primary result links on the first results page; 3) Change in the result title for the top result on the first results page; 4) Change in the URL for the top URL on the first results page; 5) Is primary advertisement provided and/or is there a change in the primary advertisement; 6) Is secondary advertisement provided and/or is there a change in the secondary advertisement; 7) Is the query altered to change one or more query terms prior to searching and/or is the query alteration the same as the previous alteration; 8) Are query answers provided and/or are the same query answers provided; 9) Is a bar of secondary content such as video, audio, or image content provided; 10) Are query suggestions provided and/or are the same query suggestions provided; 11) Are deeplinks provided for any results; 12) Are phone numbers provided for any results and/or are the same phone numbers provided as the previous day; 13) Is an information card provided regarding a result, such as an information card to describe an entity related to the query or the results; and 14) Are any alternative types of content provided, such as action buttons.

The above heuristics include a variety of values based on changes in the behavior of a results page over time. Some variation in results is typically expected over time. If enough heuristics are used and/or the heuristics are weighted appropriately, the weighted combination of the heuristics can be used as a single value to measure system health. If the value is too low, the value may indicate that the search results are not changing sufficiently. This might indicate a problem with the search engine not being updated with the most recent activity on the network. Alternatively, a value that is too high may indicate any of a variety of problems.

Additional Examples

Having briefly described an overview of various embodiments of the invention, an exemplary operating environment suitable for performing the invention is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, and the like. The invention may also be practiced in distributed computing environments where tasks are performed by remote-processing devices that are linked through a communications network.

Figure 1:
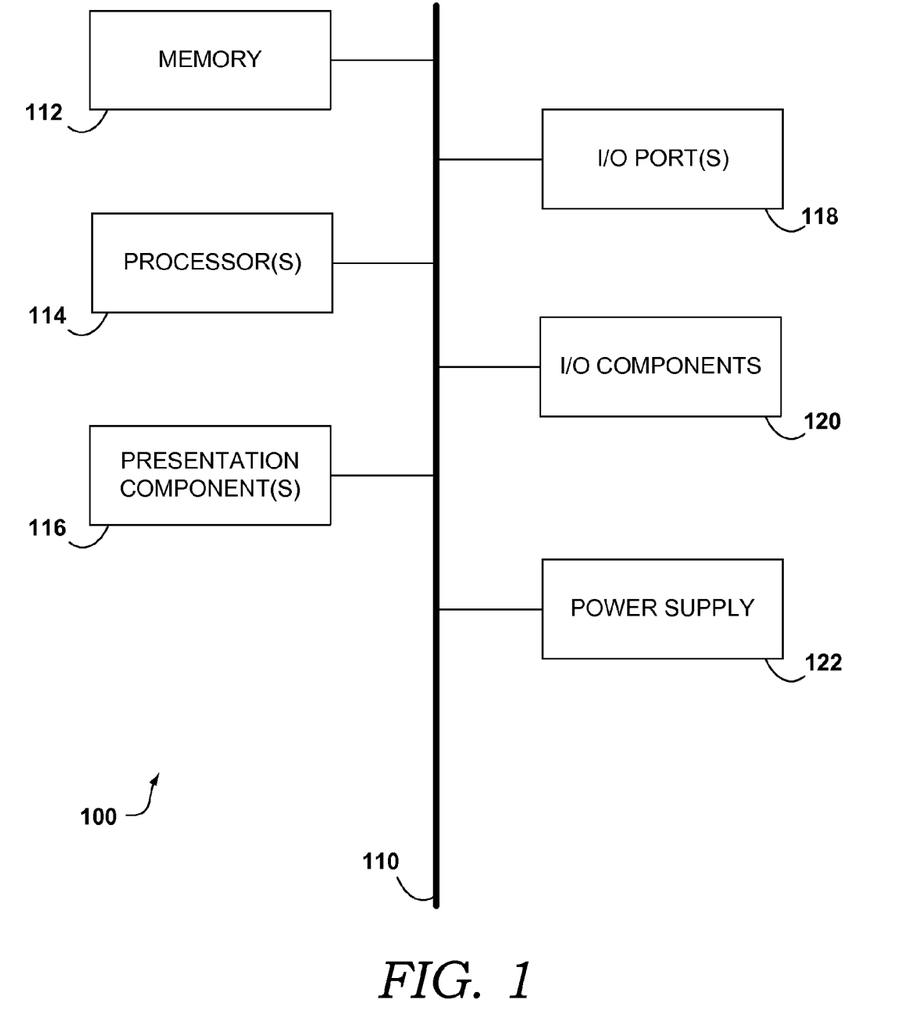
FIG. 1 is a block diagram of an exemplary computing environment suitable for use in implementing some embodiments of the invention.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the computing device 100. In an embodiment, the computer storage media can be selected from tangible computer storage media. This definition of computer storage media excludes any media that is considered a "signal per se".

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The memory 112 can include computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 can allow the computing device 100 to be logically coupled to other devices including the I/O components 120, some of which may be built in. Illustrative components can include a microphone, joystick, game pad, satellite dish, scanner, printer, wireless device, etc.

Figure 2:
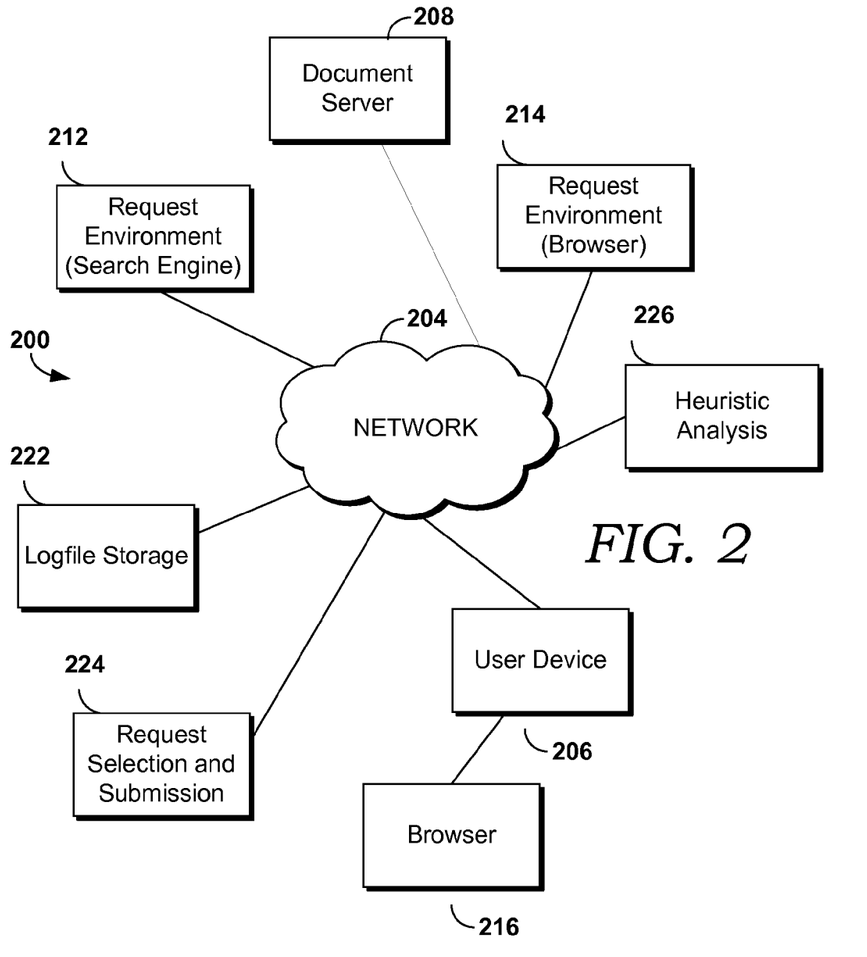
FIG. 2 schematically shows a network environment suitable for performing some embodiments of the invention.
Figure 3:
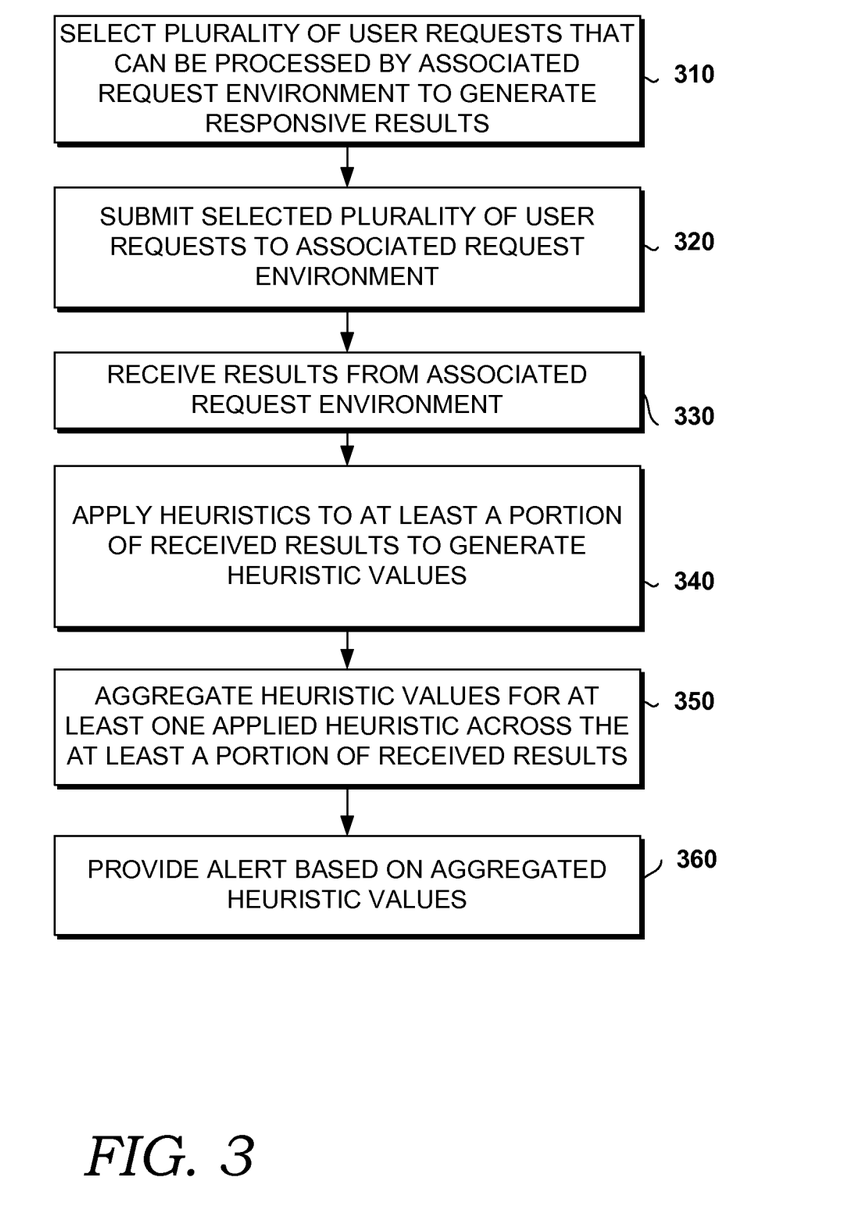
FIGS. 3-5 show examples of methods according to various embodiments of the invention.
Figure 4:
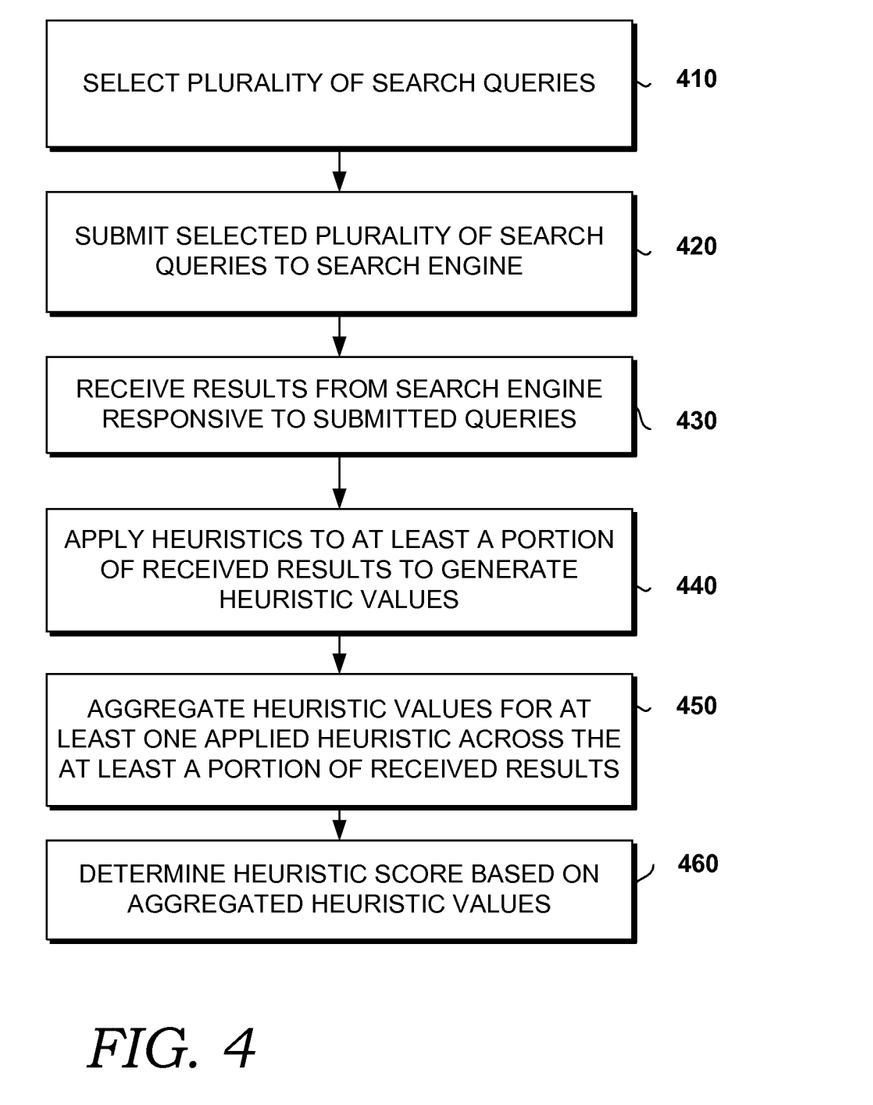
Figure 5:
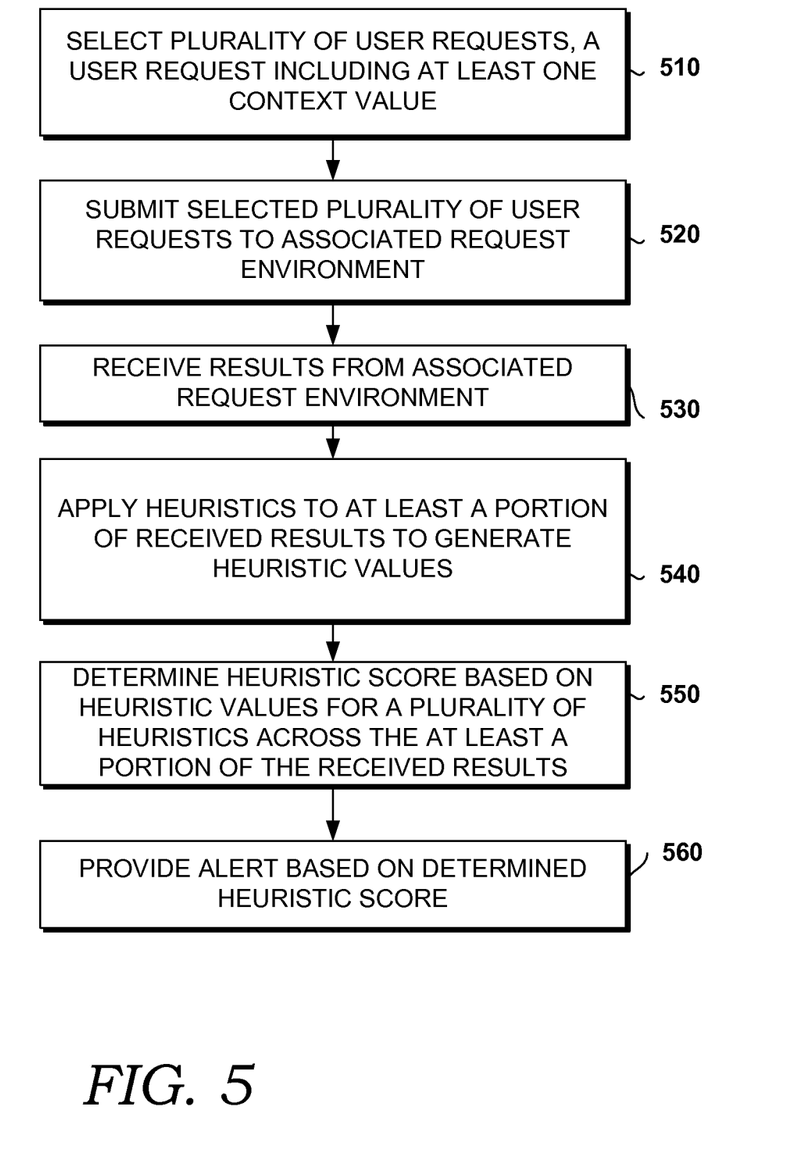

With additional reference to FIG. 2, a block diagram depicting an exemplary network environment 200 suitable for use in embodiments of the invention is described. The environment 200 is but one example of an environment that can be used in embodiments of the invention and may include any number of components in a wide variety of configurations. The description of the environment 200 provided herein is for illustrative purposes and is not intended to limit configurations of environments in which embodiments of the invention can be implemented.

The environment 200 includes a network 204, a user device 206, which includes a user browser 216, a document server 208 and a search engine 212. Search engine 212 corresponds to a type of request environment for processing user requests in the form of search queries. Another request environment in the form of a browser 214 is also shown to allow for heuristic analysis of user requests corresponding to network addresses or URLs. The environment 200 also includes logfile storage 222, a selection and submission component for user requests 224, and a heuristic analysis component 226.

The network 204 includes any computer network such as, for example and not limitation, the Internet, an intranet, private and public local networks, and wireless data or telephone networks. The user device 206 can be any computing device, such as the computing device 100, from which a search query can be provided. For example, the user device 206 might be a personal computer, a laptop, a server computer, a wireless phone or device, a personal digital assistant (PDA), or a digital camera, among others. The search engine 212 includes any computing device, such as the computing device 100, and provides functionalities for a content-based search engine. Document server 208 represents any type of computer device that can provide documents selected by a user based on results responsive to a search query and/or any type of computer device that can provide documents corresponding to a network address submitted by a user in a user browser 216 or a browser 214.

During operation, logfiles of user activity can be generated based on use of resources by a user. For example, a user can access network resources using a browser 216 on a user device 206. The activity of the user can be captured by a toolbar that is part of browser 216, by a monitoring application on user device 206, by a search engine 212, or by any other convenient application. Logfile storage 222 allows user activities to be stored until the logfile(s) are ready for processing. Request selection and submission component 224 can then analyze the store logfile(s) to select user requests. The user requests can correspond to any user request that can be handled by an associated request environment, such as a search query for handling by search engine 212 or a network address for handling by browser 214. The selected requests are submitted by submission component 224 to generate results. The results are analyzed using heuristic analysis component 226. Based on comparison of a heuristic score generated by heuristic analysis component 226 with one or more threshold values, an alert can be sent to a user that manages the behavior of some portion of environment 200 at another user device 206.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

In an embodiment, a method for assessing a user experience with an online system is provided. The method includes selecting a plurality of user requests, a user request comprising a request that can be processed by an associated request environment to generate a responsive result; submitting the selected plurality of user requests to the associated request environment; receiving results from the associated request environment based on the submitted user requests; applying one or more heuristics to at least a portion of the received results to generate heuristic values for each result of the at least a portion of the received results; aggregating the heuristic values for at least one applied heuristic across the at least a portion of the received results; and providing an alert based on the aggregated heuristic value for the at least one applied heuristic.

In another embodiment, a method for assessing a user experience with a system for providing search results is provided. The method includes selecting a plurality of search queries; submitting the selected plurality of search queries to a search engine; receiving results from the search engine responsive to the submitted plurality of search queries; applying one or more heuristics to at least a portion of the received results to generate heuristic values for each result of the at least a portion of the received results; aggregating the heuristic values for at least one applied heuristic across the at least a portion of the received results; and determining a heuristic score based on the aggregated heuristic values.

In still another embodiment, a method for assessing a user experience with an online system is provided. The method includes selecting a plurality of user requests, a user request comprising a request that can be processed by an associated request environment to generate a responsive result and at least one context value; submitting the selected plurality of user requests to the associated request environment; receiving results from the associated request environment based on the submitted user requests; applying one or more heuristics to at least a portion of the received results to generate heuristic values for each result of the at least a portion of the received results; determining a heuristic score based on heuristic values for a plurality of heuristics across the at least a portion of the received results; and providing an alert based on the determined heuristic score.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:

1. A method for assessing a user experience with an online system, comprising:
    selecting a plurality of user requests, a user request comprising a request that can be processed by an associated request environment to generate a responsive result;
    submitting the selected plurality of user requests to the associated request environment;
    receiving results from the associated request environment based on the submitted user requests;
    applying one or more heuristics to at least a portion of the received results to generate heuristic values for each result of the at least a portion of the received results, the one or more heuristics comprising comparing intended content of the at least a portion of the received results with delivered content of the at least a portion of the received results;
    aggregating the heuristic values for at least one applied heuristic across the at least a portion of the received results; and
    providing an alert based on the aggregated heuristic values for the at least one applied heuristic.

2. The method of claim 1, wherein a user request comprises a network address or a uniform resource locator, the associated request environment comprises a browser, and a received result comprises a document associated with the network address or uniform resource locator.

3. The method of claim 1, wherein a user request comprises a search query, the associated request environment comprises a search engine, and the received results comprise a plurality of links to documents responsive to the search query.

4. The method of claim 1, wherein selecting a plurality of user requests comprises extracting user requests from a logfile generated based on activities from the associated request environment.

5. The method of claim 1, wherein the selected plurality of user requests include one or more user requests from a pre-determined listing of user requests.

6. The method of claim 1, wherein a user request comprises one or more user context values.

7. The method of claim 6, wherein the one or more user context values include at least one geographic context value.

8. The method of claim 6, wherein selecting a plurality of user requests comprises:
    extracting user requests from one or more logfiles of activity corresponding to the associated request environment; and
    selecting user requests having a context value corresponding to one or more predetermined values.

9. The method of claim 1, wherein at least one heuristic of the one or more heuristics comprises a comparison of a feature for a received result for a first user request at a first time and a received result for the first user request at a second time.

10. The method of claim 1, wherein aggregating the heuristic values for an applied heuristic comprises determining an average heuristic value for the applied heuristic across each result of the at least a portion of the received results.

11. The method of claim 1, wherein aggregating the heuristic values for at least one applied heuristic comprises determining a heuristic score based on heuristic values for a plurality of heuristics across the at least a portion of the received results.

12. The method of claim 11, wherein determining a heuristic score comprises determining a weighted average of heuristic values for a plurality of heuristics across the at least a portion of the received results.

13. The method of claim 1, wherein providing an alert comprises i) comparing a heuristic score with at least one threshold value, and displaying a message regarding the heuristic score based on the comparison with the at least one threshold value, ii) preparing a report based on the aggregated heuristic values for at least one applied heuristic, and notifying at least one user regarding a status of the report, or iii) a combination thereof.

14. The method of claim 1, wherein the one or more heuristics comprise at least one heuristic of a) determining whether intended links on a page correspond to a valid URL; b) determining whether a next page feature for a page corresponding to multi-page content is working; or c) whether raw code used for specifying web page content is displayed.

15. A method for assessing a user experience with a system for providing search results, comprising:
- selecting a plurality of search queries, a selected search query comprising one or more associated context values, at least one context value of the one or more associated context values comprising a geographic context value;
- submitting the selected plurality of search queries to a search engine;
- receiving results from the search engine responsive to the submitted plurality of search queries;
- applying one or more heuristics to at least a portion of the received results to generate heuristic values for each result of the at least a portion of the received results, the one or more heuristics comprising determining whether content of the result is appropriate for a general audience;
- aggregating the heuristic values for at least one applied heuristic across the at least a portion of the received results;
- determining a heuristic score based on the aggregated heuristic values; and
- providing an alert based on the determined heuristic score.

16. The method of claim 15, wherein the search queries are selected based on search queries extracted from logfiles associated with a plurality of search engines.

17. The method of claim 15, wherein at least one heuristic of the one or more heuristics comprises a comparison of a feature for a received result for a first query at a first time and a received result for the first query at a second time.

18. The method of claim 15, wherein the received results comprise a plurality of links to documents responsive to the submitted plurality of search queries.

19. A system for assessing a user experience with an online system, comprising:
- a logfile storage;
- a request selection and submission component configured to:
  - select a plurality of search queries from the logfile storage, a search query comprising a request that can be processed by an associated search query environment to generate a responsive result and at least one context value; and
  - submit the selected plurality of search queries to the associated search query environment; and
- a heuristic analysis component configured to:
  - receive results from the associated search query environment based on the submitted search queries;
  - apply one or more heuristics to at least a portion of the received results to generate heuristic values for each result of the at least a portion of the received results, the one or more heuristics comprising determining overall system health for the associated search query environment;
  - determine a heuristic score based on heuristic values for a plurality of the one or more heuristics across the at least a portion of the received results; and
  - provide an alert based on the determined heuristic score.

20. The system of claim 19, wherein the one or more heuristics comprise at least one heuristic of a) monitoring a change in a result title for a top result on a first results page; b) monitoring a change in a URL for a URL on the first results page; or c) monitoring whether a search query submitted to the associated search query environment is altered to change one or more query terms prior to searching; d) monitoring changes in query answers provided; e) monitoring changes in query suggestions provided; or f) monitoring whether deeplinks are provided.

* * * * *

UNITED STATES PATENT AND TRADEMARK OFFICE
CERTIFICATE OF CORRECTION

PATENT NO. : 9,444,674 B2
APPLICATION NO. : 13/633786
DATED : September 13, 2016
INVENTOR(S) : Killow et al.

Page 1 of 1

It is certified that error appears in the above-identified patent and that said Letters Patent is hereby corrected as shown below:

In the Claims
Column 18, Line 29: Remove "or" after "page."

Signed and Sealed this
Twenty-eighth Day of February, 2017

Michelle K. Lee
*Director of the United States Patent and Trademark Office*